UNITED STATES PATENT OFFICE.

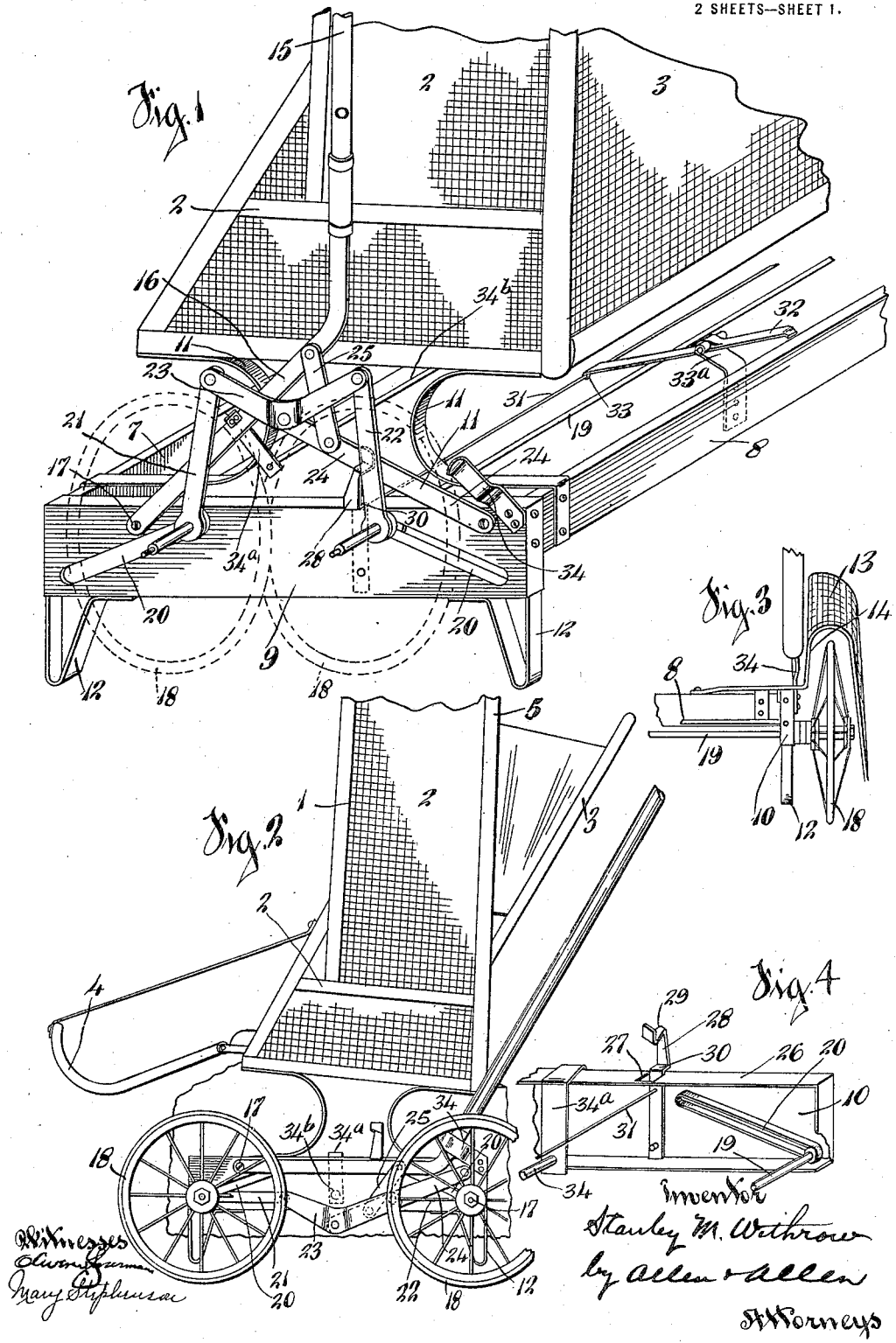

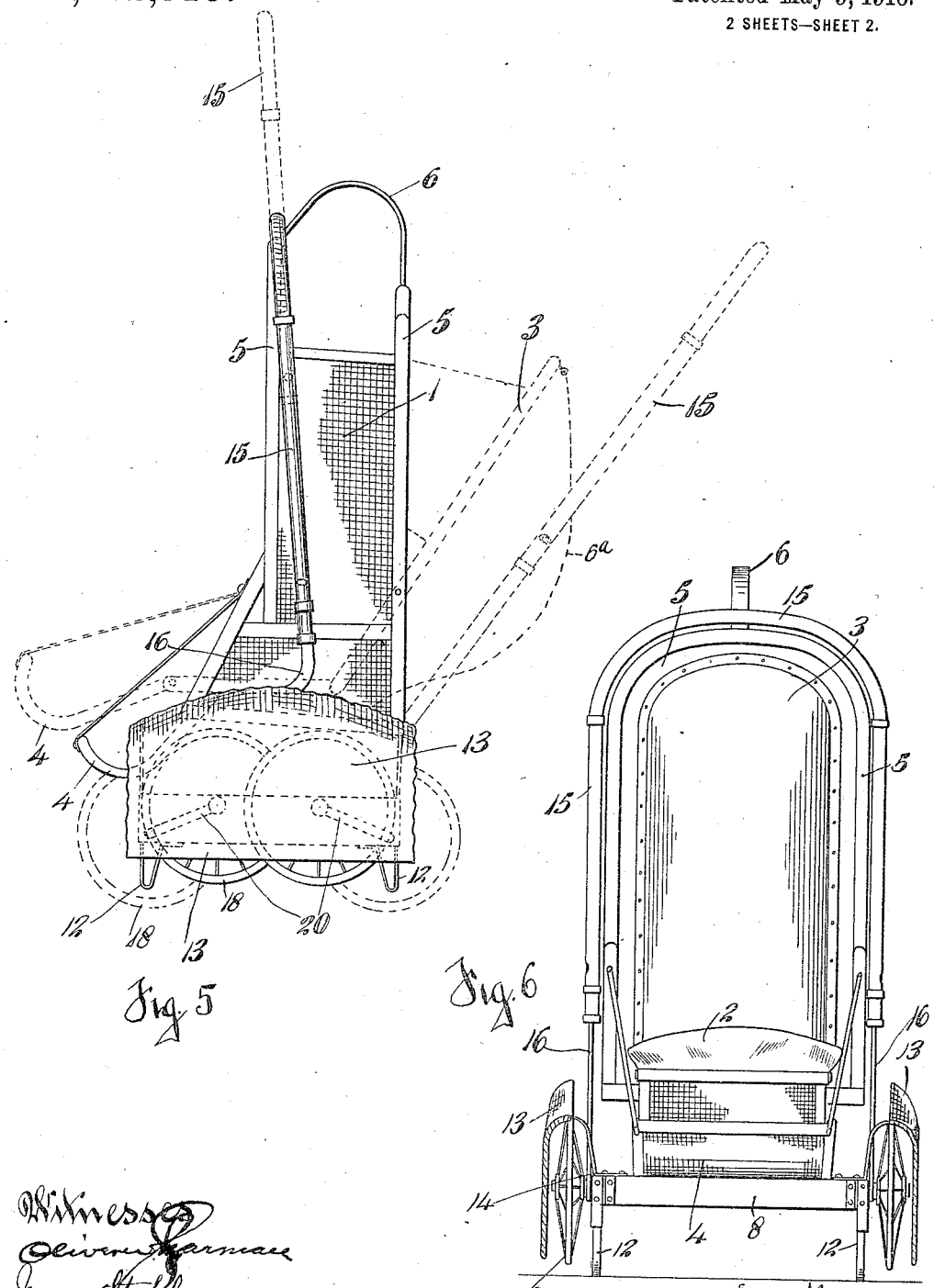

STANLEY M. WITHROW, OF WYOMING, OHIO.

GO-BASKET.

1,182,519.  Specification of Letters Patent.  Patented May 9, 1916.

Application filed January 2, 1915.  Serial No. 38.

*To all whom it may concern:*

Be it known that I, STANLEY M. WITHROW, a citizen of the United States, and a resident of Wyoming, in the county of Hamilton and State of Ohio, have invented certain new and useful Improvements in Go-Baskets, of which the following is a full, clear, and exact description, reference being had to the accompanying drawings, forming part of this specification.

My invention has relation to vehicles for babies of the type known as go-baskets, in which there is provided a vehicle that is so light in weight that it can be carried like a basket.

Heretofore in the art, the customary form of go-basket has been a two-wheeled structure in which the wheels were raised alongside of the carriage, so that the carriage would stand without rolling when in carrying position. To raise the wheels of a four-wheeled carriage, in a convenient manner, has not so far been developed, and it is the object of this invention to provide a multi-wheeled go-basket of this type. This object I accomplish by that certain construction and arrangement of parts to be hereinafter more specifically pointed out and claimed, wherein the wheels are mounted so as to be raised without altering the position of the base frame of the vehicle, and furthermore wherein a go-basket with the raisable feature is provided which has a frame distinct from the carriage body, thereby permitting the use of springs in the support of the body.

In the drawings, Figure 1 is a perspective view of the lower portions of the go-basket with the wheels removed. Fig. 2 is a side elevation of the lower portion of the go-basket. Fig. 3 is a rear elevation of a rear wheel and mounting showing the guard therefor. Fig. 4 is a detail perspective of one of the side frame pieces, showing the parts mounted thereon. Figs. 5 and 6 are side and front elevations respectively of the go-basket.

The vehicle has a basket or body having sides 1, a seat 2, a reclining back 3 and a pivotally mounted foot rest 4. The arched frame pieces 5, 5, of the body have a connecting handle 6 which serves as the carrying handle of the basket, and a cord $6^a$ controls the reclining back. The structure of the basket so far briefly mentioned is the same as that shown and described in my pending application which has now gone to allowance, Serial No. 836,799, filed May 6, 1914, and reference is made to that application for a more detailed description of the basket structure noted.

The vehicle has a frame independent of the basket having front and back pieces 7, 8, and sides 9 and 10 respectively, and the basket is supported thereon by any desired springs 11, 11. Mounted on the corners of this base frame are legs 12, 12, of any desired type, but preferably comprising bent metallic strips secured by screws to the frame. These legs are provided for use when the wheels are raised, so that the basket will stand upon them, and their length should be such as to just allow the wheels to clear the ground when in raised position. As a guard for the wheels, the wicker shields 13, 13, are provided, and mounted on the base frame by means of small angle plates 14, 14, screwed thereon. The legs are located at a position directly adjacent to the point where the periphery of the wheels contact with the ground. Thus when the wheels ride over an obstruction, the legs will do so as well.

The wheeling handle 15 is telescopic in structure so that it may be elongated when wheeling and shortened when the carriage is to be used as a basket, and at its lower end is connected direct to the actuating lever 16 of a toggle system which serves to raise the wheels so as to clear the legs 12, said lever being pivoted at 17, 17, at the front of the side base frame members. The handle, as will be described, when pulled back so as to lie at an angle to the carriage in convenient position for wheeling, will raise the carrying wheels by means of said toggle system.

The carrying wheels 18, 18, of which there are four, although the same structure would be as well adapted to a two-wheeled basket with obvious mechanical modifications, are mounted on axles 19 which extend across the frame, each axle carrying two wheels. These axles are mounted in inwardly and upwardly angling slots 20, 20, in the two side base frame pieces, the slots for the forward and back axle converging at each side. It is designed to pull the axles together and upwardly when the basket is in carrying position, and to push them downwardly and apart when it is desired to wheel the same. Levers 21, 21 are pivoted at each side to the forward axle and levers 22, 22 to the rear axle, and at each side the forward and rear levers have pivotal connection with the two ends of common U-shaped pieces 23. Stops (not shown) are provided for this connection as is customary, to prevent overthrow of the toggle joint. Pivoted to the central portion of each U-shaped piece is another lever 24, which has its other end pivoted to the rear end of the frame side piece. The lever on which the wheeling handle is mounted, as already stated, is connected to this last lever 24 by a link 25, which is connected to the lever 24 at a point near its connection with the U-shaped piece. It can thus be seen that when the handle is pulled back, the link 25 will press down the lever 24 which by means of the U-shaped piece will spread the lower ends of the axle levers 21 and 22. This will result in forcing the axles into a position at the lower and outer ends of the slots 20, thereby raising the basket. The legs are of such length that the periphery of the wheels will then contact with the ground so that the basket can be wheeled along. If, however, it is desired to carry the basket and put it in a position that it will not move when set down, the wheeling handle is pushed up, which by a reversal of the action above described will result in the wheels being retracted from the ground and the go-basket settling on its legs. The handle being very long in proportion to the levers for raising the wheels, there will not be required any very great strength to accomplish these movements, and it will be readily possible for these changes to be made by any nurse without removing the baby from the basket. It will be understood that the wheels are inside of the guards so that none of the mechanism is in view or open so as to catch the clothing, and that the parts will be so proportioned that a very large movement of the wheels will not be necessary to raise them.

A lock is provided, applied to the lever 24, for holding the parts in raised or lowered position once the axles have been moved. The frame pieces 9 and 10 are preferably flanged metal plates, or else they are provided with flanges 26 extending inwardly of the frame. In the flange at each side a cut 27 is made, and a spring finger 28 inserted through this cut and riveted to the frame piece. The upper end 29 of this finger, which is free to move because of the springiness of the metal, extends inwardly into the path of the lever 24. When in normal position, this end will prevent movement of this lever, when it is raised by engaging it underneath and when it is lowered by engaging over the upper side of the lever 16 by means of a shoulder 30 formed by a bend in the finger parallel to the upper end 29. A wire 31 is stretched taut across the frame and connected to both spring fingers, and this wire is adapted to be pulled up at the middle thereby drawing the two catches toward each other and allowing the lever 24 to be free to move from either position. For the purpose of pulling up this wire, a foot treadle 32 which engages the wire at 33, is pivotally mounted on a small bracket 33$^a$ on the rear frame piece 8.

It will be understood that all of the levers in the toggle system now described are pivoted on the outside of the frame pieces which serves to maintain them fairly in a vertical plane. To prevent the handle from getting out of vertical alinement when pushed backwardly, a small guard plate 34 is provided, mounted at the rear of the frame and bent outwardly at its end so as to engage the lever 16 of the handle as it is drawn back and guide it into proper alinement. In addition to or instead of the guard plate another guide is provided. This guide comprises fingers 34$^a$ mounted on the levers 16, bent inwardly at right angles to the levers and then downwardly so as to engage over the side frame pieces. The downwardly depending portions are made so as to flare inwardly thereby insuring their engagement over the frame when the lever is pushed down in lowering the wheels, and furthermore they are connected with each other by a dowel 34$^b$ so that a bending of them out of shape will be provided against.

It is necessary to have a guiding means because when the wheels are in lowered position and the vehicle is being wheeled, there is liable to be considerable jarring and twisting in crossing curbs and the like, which would cause displacement of the handle levers, thereby resulting in a pulling away from the locking means and a falling of the vehicle into carrying position. The guides prevent this and as such are an important part of my device.

It is believed that the operation of the basket is now clear. By reference to particular mechanical expedients, it is not desired to limit the claims that follow as against equivalent structures to those herein described, where the claims do not so particularize.

Having therefore described my invention, what I claim as new and desire to secure by Letters Patent, is:—

1. In a device of the character specified, in combination with a receptacle for a baby, a frame for supporting the receptacle, and wheels for said device slidably mounted thereon and having when in wheeling position a wheel base substantially equal to the length of the frame.

2. In a device of the character described, a receptacle for a baby, a set of four carrying wheels for said receptacle, axles for said wheels, and means for slidably mounting said axles with relation to the receptacle with the axles when in wheeling position located so as to provide a wheel base substantially equal to the length of the frame for the purpose described.

3. In a device of the character described, in combination with a receptacle for a baby, a frame for supporting the receptacle, wheels for said frame slidably mounted thereon so as to be raised and lowered, and means for locking them in raised or lowered position.

4. In a device of the character described, in combination with a receptacle for a baby, a frame for supporting said receptacle, axles slidably mounted on said frame, so as to be moved away from and toward the ground, wheels on the axles, whereby the sliding upward of the axles will put the device in non-wheeling position, and sliding downward will put it in wheeling position, said axles located when in downward position substantially at the corners of the frame.

5. In a device of the character described, in combination with a receptacle for a baby, a frame for supporting said receptacle, axles slidably mounted on said frame, so as to be moved away from and toward the ground, wheels on the axles, whereby the sliding upward of the axles will put the device in non-wheeling position, and sliding downward will put it in wheeling position, and means for locking the axles in raised or lowered position.

6. In a device of the character described, in combination with a receptacle for a baby, a frame for supporting the receptacle, wheels for said frame and axles therefor, diagonal slots in the frame for mounting the axles mutually inclined toward their upper ends and means for sliding the axles in the slots, for the purpose described.

7. In a device of the character described, a receptacle for a baby, a set of four wheels for said receptacle, axles for said wheels, means for slidably mounting said axles, a handle for wheeling said device, and means connected to the handle for sliding said axles.

8. In a device of the character described, in combination with a receptacle for a baby, a frame for supporting the receptacle, a handle for wheeling said device, wheels for said frame slidably mounted thereon, and means connected with said handle for sliding the wheels, for the purpose described.

9. In a device of the character described, a receptacle for a baby, a frame for supporting the receptacle, wheels for said frame and axles therefor, a handle for wheeling said device, and means connected to said handle for sliding the axles on the frame, for the purpose described.

10. In a device of the character described, in combination with a receptacle for a baby, a carrying handle for said receptacle, a frame, springs intermediate the frame and the receptacle, and more than two wheels for said receptacle movably mounted on the frame so as to be placed into and out of contact with the ground.

11. In a device for wheeling a baby, in combination with a receptacle for a baby, a set of more than two wheels for said device, means for mounting said wheels so as to support said receptacle, and means for raising said wheels out of contact with the ground, and for drawing them substantially toward each other so that in raised position they present no impediment to the carrying of the receptacle.

12. In a device for wheeling a baby, a receptacle for a baby, a frame for supporting said receptacle, axles, wheels mounted on said axles, means for movably mounting said axles on the frame and means for raising said axles with relation to the frame to remove the wheels from the ground and for drawing the axles substantially toward each other so that the wheels present no impediment to the carrying of the receptacle.

13. In a device of the character described, in combination with a receptacle for a baby, more than two carrying wheels for said receptacle, and means for raising all the wheels simultaneously so that the receptacle will not become out of equilibrium during the raising of the wheels, and means for bringing the wheels substantially together, for the purpose described.

14. In a device of the character described, in combination with a receptacle for a baby, more than two carrying wheels for said receptacle, and means for raising all the wheels simultaneously so that the receptacle will not become out of equilibrium during the raising of the wheels, and means for locking the wheels in raised or lowered position, and means for positively releasing said lock when it is desired to change the position of the wheels.

15. In a device of the character described, in combination with a receptacle for a baby, a frame for supporting the receptacle, wheels for said frame slidably mounted thereon so as to be raised and lowered, and means for locking them in raised or lowered position, and means for holding the wheels from jarring out of locked position.

16. In a device of the character specified, in combination with a receptacle for a baby, a frame for supporting said receptacle, axles slidably mounted on said frame and wheels on said axle, for the purpose described, and means for locking the axles in raised or lowered position.

17. In a device of the character specified, in combination with a receptacle for a baby, a frame for supporting said receptacle, axles slidably mounted on said frame and wheels on said axle, for the purpose described, and means for locking the axles in raised or lowered position, and means for holding the wheels from jarring out of locked position.

18. In a device of the character described in combination with a receptacle for a baby, a frame for supporting said receptacle mounted in fixed relation to the same, and wheels for the device movably mounted on the frame, and means for raising said wheels on said frame so as to be out of contact with the ground, and for drawing them substantially toward each other so that in raised position they present no impediment to the carrying of the receptacle.

19. In a device of the character described, a receptacle for a baby, a set of four wheels for said receptacle, axles for said wheels, means for slidably mounting said axles, a handle for wheeling said device, and means connected to the handle for sliding said axles, means for locking the axles in raised or lowered position and means for maintaining the handle in fixed relation with the frame to prevent the jarring of the axle out of locked position.

20. In a device of the character described, a receptacle for a baby, a frame for supporting the receptacle, wheels for said frame and axles therefor, a handle for wheeling said device, and means connected to said handle for sliding the axles on the frame, and means for guiding and holding the handle in fixed relation with the frame, for the purpose described.

21. In a device of the character described, in combination with a receptacle for a baby, a carrying handle thereof, fixed supports for maintaining said receptacle in a standing position, more than two carrying wheels for said receptacle, and means for moving said wheels into contact with the ground at a position lower than the fixed supports and for raising them out of contact with the ground without supporting the receptacle on one or two wheels alone at any point of the raising or lowering operation.

22. In a go-basket, in combination with a receptacle for a baby, a frame for supporting the receptacle, legs for said receptacle, and carrying wheels movably mounted in the frame, with the contact points of the legs and of the wheels with the ground directly adjacent to each other so that the riding of the wheels over an obstruction will carry the legs over also.

23. In a device of the character described, in combination with a receptacle for a baby, a set of more than two wheels for said device, means for mounting said wheels so as to support said receptacle, fixed supports for maintaining the receptacle in a standing position, and means for raising said wheels out of contact with the ground, and for drawing them toward each other so that in raised position they present no impediment to the carrying of the receptacle.

24. In a device of the character described, a receptacle for a baby, a frame for supporting said receptacle, fixed supports on the frame for maintaining the device in a standing position, axles, wheels mounted on said axles, means for movably mounting said axles on the frame and means for raising said axles with relation to the frames to remove the wheels from the ground and for drawing the axles toward each other so that the wheels present no impediment to the carrying of the receptacle.

25. In a device of the character described, in combination with a receptacle for a baby, legs for said receptacle, carrying wheels movably mounted with regard to the receptacle, with the contact position of the wheels and the legs with the ground directly adjacent to each other so that the riding of wheels over an obstruction will carry the legs over also.

26. In a device of the character described, to be wheeled or carried, in combination with a body portion for said device, more than two carrying wheels for said device, and means for sliding the carrying wheels toward each other to shorten the wheel base so as not to interfere with the carrying of the device.

27. In a device of the character described to be wheeled or carried, in combination with a body portion for said device, more than two carrying wheels for said device, axles for the wheels and slots for said axles in the body portion whereby they may be slid together to shorten the wheel base so that the wheel will not interfere with the carrying of the device.

28. In a device of the character described, in combination with a receptacle for a baby, more than two carrying wheels for said receptacle and means for raising all of the wheels without supporting the device on one or two wheels alone at any point of the operation, and for drawing the wheels toward each other in the same operation.

29. In a device for wheeling a baby in combination with a body portion for said device; more than two carrying wheels for said device and means for moving the wheels substantially toward each other to shorten the wheel base so as not to interfere with the carrying of the device.

STANLEY M. WITHROW.

Witnesses:
LORENZ L. LEMPER,
MARY STEPHENSON.